United States Patent
Shetty

(10) Patent No.: US 12,273,456 B2
(45) Date of Patent: Apr. 8, 2025

(54) TWO-WAY AUTHENTICATION FOR VOICE-ACTIVATED DEVICES

(71) Applicant: Omnissa, LLC, Mountain View, CA (US)

(72) Inventor: Rohit Pradeep Shetty, Bengaluru (IN)

(73) Assignee: Omnissa, LLC, Mountain View, CA (US)

( * ) Notice: Subject to any disclaimer, the term of this patent is extended or adjusted under 35 U.S.C. 154(b) by 359 days.

(21) Appl. No.: 16/659,016

(22) Filed: Oct. 21, 2019

(65) Prior Publication Data

US 2021/0119802 A1    Apr. 22, 2021

(51) Int. Cl.
*H04L 9/32* (2006.01)

(52) U.S. Cl.
CPC .......... *H04L 9/3231* (2013.01); *H04L 9/3228* (2013.01); *H04L 9/3242* (2013.01)

(58) Field of Classification Search
CPC .... H04L 9/3213; H04L 9/3228; H04L 9/3242
See application file for complete search history.

(56) References Cited

U.S. PATENT DOCUMENTS

| | | | | |
|---|---|---|---|---|
| 10,412,080 | B1* | 9/2019 | Edwards | H04L 61/5007 |
| 2009/0199276 | A1* | 8/2009 | Schneider | H04L 63/0815 726/5 |
| 2010/0183150 | A1* | 7/2010 | Lee | H04L 9/0822 380/278 |
| 2013/0004142 | A1* | 1/2013 | Grab | H04N 5/913 386/E5.028 |
| 2019/0058586 | A1* | 2/2019 | Kumar | H04W 12/06 |
| 2019/0334955 | A1* | 10/2019 | Lee | H04L 65/1101 |
| 2020/0007334 | A1* | 1/2020 | Shah | H04L 63/0853 |
| 2020/0044849 | A1* | 2/2020 | Bovalino, III | H04L 9/3213 |
| 2020/0099996 | A1* | 3/2020 | Sankaran | H04N 21/4755 |

(Continued)

OTHER PUBLICATIONS

Zaid Shakir Al-Attar • Tarek Abbes • Faouzi Zerai; Smartphone-Key: Hands-Free Two-Factor Authentication for Voice-Controlled Devices Using Wi-Fi Location; IEEE Transactions on Network and Service Management (vol. 20, Issue: 3, 2023, pp. 3848-3864); (Year: 2023).*

(Continued)

*Primary Examiner* — Luu T Pham
*Assistant Examiner* — Chao Wang
(74) *Attorney, Agent, or Firm* — Kim & Stewart LLP

(57) ABSTRACT

Examples described herein include systems and methods for authenticating a voice-activated device. An example method can include receiving, at an application server, a request from a user device to authenticate the voice-activated device. The application server can provide a first temporary key and session ID to the user device. The method can further include communicating the first temporary key from the user device to the voice-activated device, such as by reading it aloud or having the user device communicate the key in some manner. The voice-activated device can then provide the key to the application server, which generates a second temporary key and sends it back to the voice-activated device. The second temporary key can then be transferred to the user device, which closes the loop by providing the key back to the application server. The application server can then authenticate and provide access to the voice-activated device.

17 Claims, 4 Drawing Sheets

(56) References Cited

U.S. PATENT DOCUMENTS

2021/0036859 A1* 2/2021 Sukhomlinov ..... H04L 63/0853
2021/0111898 A1* 4/2021 McCarty ............. H04L 63/0853

OTHER PUBLICATIONS

Petros Spachos • Stefano Gregori • M. Jamal Deen; Voice Activated IoT Devices for Healthcare: Design Challenges and Emerging Applications; IEEE Transactions on Circuits and Systems II: Express Briefs (vol. 69, Issue: 7, 2022, pp. 3101-3107); (Year: 2022).*
S. Sandosh • Raina Saxena • Shashvi Shah • Sai Sahiti Rachiraju; State-of-the-Art of Voice Assistance Technology, Mitigating Replay Attacks: A Comprehensive Discussion; 2024 5th International Conference on Intelligent Communication Technologies and Virtual Mobile Networks (ICICV); (Year: 2024).*

* cited by examiner

TWO-WAY AUTHENTICATION FOR VOICE-ACTIVATED DEVICES

BACKGROUND

Voice-activated devices continue to increase in popularity, allowing users to request information or action using verbal questions or commands. Many voice-activated devices include virtual assistants that can verbally respond to a user's request. These voice-activated devices can be stand-alone devices that perform a wide range of functions, such as playing music, gathering weather data, and reading aloud a user's messages or emails.

In some situations, such as a request for local weather information, a voice-activated device can respond to the user without requiring additional authentication. In other situations, such as a request to read enterprise content such as a work-related email, the voice-activated device requires authentication.

Authentication with a voice-activated device can be cumbersome for a user. For example, the user may need to navigate to a third-party webpage and enter the relevant credentials. The user may be discouraged by the inconvenience or may lack sufficient trust in the third-party system to provide important credentials. In some situations, such as in a hotel room, the voice-activated device may be locked down to only provide basic skills, thus preventing any authentication.

The various inefficiencies associated with authentication are well known. In the context of user devices, such as phones and tablets, some of these inefficiencies have been addressed by applications that provide credentialing functions. For example, some applications can provide an authenticated user with access to multiple other applications or other enterprise data. However, these applications have not been able to assist a user with logging in to a voice-activated device.

As a result, despite recent advances in authentication techniques, a need still exists for systems and methods for authenticating a voice-activated device in a more efficient manner, such as by using an application on a user device that is authenticated with an application server.

SUMMARY

Examples described herein include systems and methods for authenticating a voice-activated device using an application server that supports an application on a user device. An example method can include receiving, at the application server, a request from the user device. The request can relate to authenticating with a voice-activated device. For example, the request can be made from the application on the user device that is associated with the application server. The application can provide an interface for requesting authentication with voice-activated devices. In some examples, the request can include a session ID applicable to the authentication session.

The method can include the application server providing a first temporary key to the user device. The key can be temporary in nature, such that it is only valid for a certain amount of time. The application server can also establish a session ID, if it has not been established already, and associate the session ID with the first temporary key. The application server can store a mapping file that associates the first temporary key to the session ID.

The method can further include communicating the first temporary key from the user device to the voice-activated device. This can be accomplished in many ways. For example, the voice-activated device can listen for an auditory communication from the user or the user device. The user can simply read the characters of the first temporary key out loud, allowing the voice-activated device to listen and capture the information. In another example, the user device can speak the characters of the first temporary key out loud, having the same effect. In yet another example, the user device can produce other sounds corresponding to the first temporary key, such as by using ultrasonic frequencies or by using an auditory code corresponding to numbers and letters.

The key can also be communicated between devices using any wireless electronic communication form. For example, the devices can use near-field communication ("NFC"), BLUETOOTH, WIFI, or any other wireless protocol for communicating the key. Regardless of the transmission method, the key can be encrypted by the sending device, sent in an encrypted form, and decrypted by the receiving device. This step can be performed automatically by the application, without requiring user interaction.

With the first temporary key communicated to the user device, the method can further include providing the first temporary key from the voice-activated device to the application server. The voice-activated device can also provide a device ID corresponding to the voice-activated device. The application server can then update its mapping for the first temporary key to reflect an association with the device ID.

The method can also include providing a second temporary key to the voice-activated device. The second temporary key can be mapped to the device ID and that mapping can be stored at the application server. The voice-activated device can then assist in communicating the second temporary key to the user device, such as in a manner similar to that used for communicating the first temporary key between the two devices. The user device, having received the second temporary key, can then transmit the second temporary key to the application server. The user device can also transmit a session ID received earlier.

The application server can then complete the mapping of the second temporary key by updating the mapping file to include the second temporary key, session ID, and device ID. The application server can then compare the mappings for the first and second temporary keys to ensure that the device IDs and session IDs match, and if so, authenticate the voice-activated device. After authentication, the application server can provide enterprise content to the voice-activated device.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
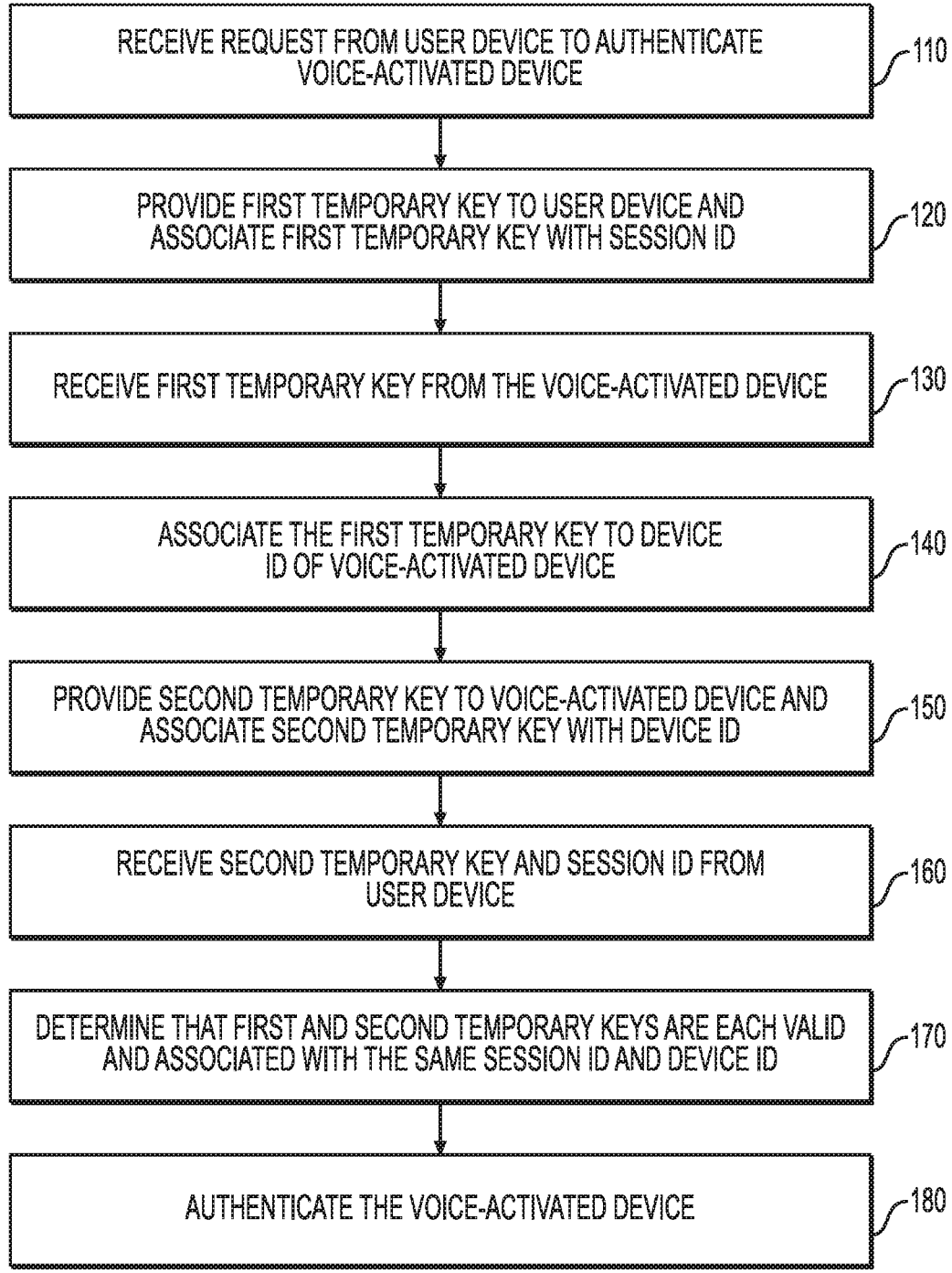
FIG. 1 is a flowchart of an example method for authenticating a voice-activated device.

FIG. 1 provides a flowchart of an example method for authenticating a voice-activated device. Stage 110 can include receiving a request from a user device to authenticate a voice-activated device. The user device can be any type of computing device with a hardware-based processor and a memory storage, such as a phone, tablet, laptop computer, or desktop computer. The voice-activated device can be any type of computing device having a hardware-based processor, a microphone, and a speaker and be configured to receive voice commands. For example, the voice-activated device may have a "virtual assistant" functionality that allows the device to recognize voice commands and communicate with a user.

In some examples, the request can originate from an application executing on the user device. Any type of application can potentially make this request, including an application configured to provide access to a voice-activated device. The application can establish privileged access with a remote server that supports the application, referred to herein as an application server. The application server can authenticate the application or the user device, or both, and can provide various access and content to the user device. For example, the application server can provide enterprise content that requires authentication and compliance in accordance with enterprise requirements. The application server can ensure that only a compliant user device receives enterprise content.

In another example, the application server can assist in authenticating the user with other applications, such as by providing single sign on ("SSO") functionality. The application server can authenticate the user device across multiple applications, servers, or systems. In some examples, the application server can provide the application with authentication credentials to be used across those multiple applications, server, or systems.

The request at stage 110 can be initiated by a user device manually by the user or automatically by the application. In one example, the user navigates to a page of the application that relates to authenticating voice-activated devices. In another example, the application automatically recognizes that a user is attempting to connect to a voice-activated device and sends the request to the application server without any user intervention. The application can perform this recognition by, for example, recognizing a phrase or other sound emitted by the voice-activated device.

In one example, a user asks the voice-activated device to "read my new emails from [my enterprise email account]." The voice-activated device, needing authentication to access that email account, can respond with "I need authorization from [email provider or application server] to access your email account." This phrase can trigger the application on the user device to issue a request at stage 110. In another example, the voice-activated device emits a sound, or series of sounds, that is recognizable by the application as being associated with the application server.

At stage 120, the application server can provide a first temporary key to the user device. The key can be temporary in the sense that it is only valid for a predetermined amount of time. This time period can range from a few seconds to minutes, hours, or days, depending on the example and on settings established by an administrator. The key can take any form, such as a password, token, or certificate. As part of stage 120, the application server can also generate a session ID for the authentication session. The session ID can be an identification, such as a string of characters, that can be stored as an entry in a table. The table entry can include both the first temporary key and the session ID, associating the two with one another. The table entry can be stored in a database at the application server, or located remotely from, but accessible to, the application server. In some examples, the application can generate the session ID and include it with the request to the application server at stage 110.

At stage 130, the application server can receive the first temporary key from the voice-activated device. The procedures for transmitting the first temporary key from the user device to the voice-activated device are described with respect to FIGS. 2 and 3, below. After the voice-activated device receives the key, it can contact the application server and include the key in the transmission. In some examples, the voice-activated device also provides a device ID corresponding to the voice-activated device. At stage 140, the application server can associate the first temporary key to the device ID by, for example, storing the key and the device ID in the same row of a table. For example, the application server can insert the device ID as another entry in a row of a table that would then include the first temporary key, the session ID, and the device ID.

At stage 150, the application server can provide a second temporary key to the voice-activated device. For example, the application server can generate the second temporary key based on receiving the first temporary key from the voice-activated device. The second temporary key can have a similar format to the first temporary key, but in some examples can have a different format. It can be temporary based on a time limit after which the key is no longer valid. This time limit can be the same or different from the time limit applicable to the first temporary key. As part of stage 150, the application server can associate the second temporary key with the device ID of the voice-activated device. For example, the application server can store a new entry in the table, such as by saving the second temporary key and the device ID in two cells of the same row in the table.

At stage 160, the application server can receive the second temporary key and the session ID from the user device. The manner in which the user device receives the second temporary key from the voice-activated device is discussed in more detail with respect to FIGS. 2 and 3. The session ID provided by the user device at this stage can be the same session ID provided to the user device at stage 120 of the method. This stage can also include associating the session ID with the second temporary key, such as by saving the session ID in a third field of the row of the table that includes the second temporary key.

At this point in the example method, the application server has access to at least two rows of a table that include association information between the user device, voice-activated device, first temporary key, and second temporary key. For example, the table can include rows such as the example rows below:

| Temporary Key #1 | Session ID | Device ID (of voice-activated device) |
| Temporary Key #2 | Session ID | Device ID (of voice-activated device) |

At stage 170, the application server can determine that the first and second temporary keys are each valid and associated with the same session ID and device ID. The application server can determine the validity of the keys by, for example, confirming that neither of the keys have expired based on the temporary time period assigned to each. The application server can also compare the stored entries, such as the two example rows shown above, to confirm that the Session IDs and Device IDs match. This can confirm that both the user device and the voice-activated device are requesting access for the same session.

Based on the determination at stage 170, the application server can authenticate the voice-activated device at stage 180. Authentication can include, for example, providing the voice-activated device with an authentication token or certificate that can be used to access enterprise data. In some examples, the authentication can be specific to the type of enterprise data requested by the user. As an example, if the method initiates based on a user asking for information about his or her enterprise email account, the authentication at stage 180 can be specific to that enterprise email account. In other examples, the authentication can broadly apply to all enterprise data. An administrator can configure the scope of the authentication provided at this stage. Additionally, the authentication can be temporary, such that the voice-activated device is only authorized to access the relevant enterprise data for a predetermined period of time.

Figure 2:
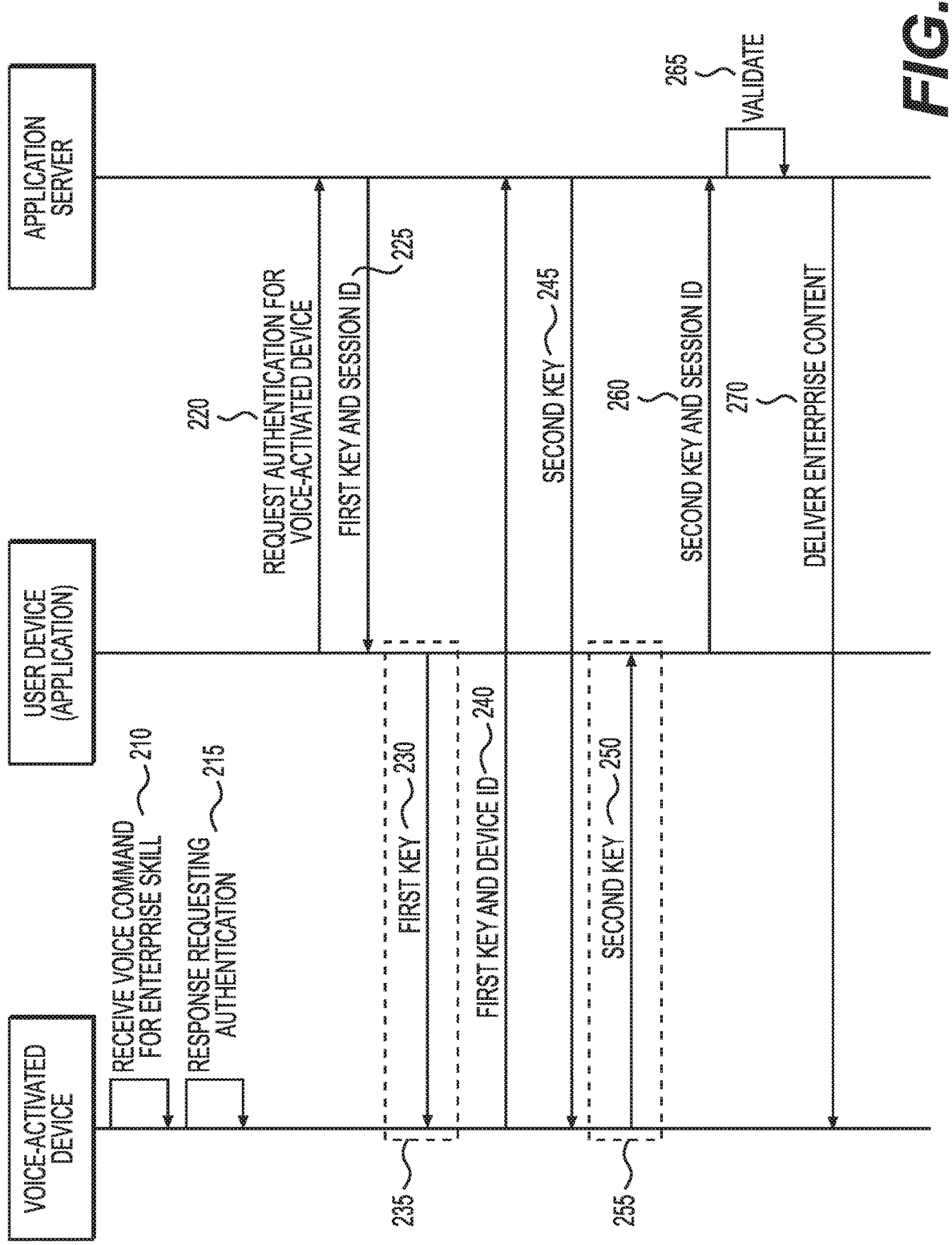
FIG. 2 is a sequence diagram of an example method for authenticating a voice-activated device.

FIG. 2 provides a sequence diagram of an example method for authenticating a voice-activated device. At stage 210, the voice-activated device can receive a voice command from a user for an enterprise skill. As used herein, the term "skill" refers to any voice-activated capability of the voice-activated device. By way of example, a skill can include retrieving a weather report for a location, reading an email or message, playing a song or radio station, and initiating a phone call. An enterprise skill can be any skill that involves enterprise data, such as a skill that requires authentication from an enterprise server (such as the application server) or that requests information stored at an enterprise storage location.

At stage 215, the voice-activated device can respond to the user. The response can inform the user than authentication is required, such as by verbally responding to the user accordingly. In some examples, the response at stage 215 is directed to the application executing on the user device. For example, the response can include an auditory signal that alerts the application to the need for authentication. The signal can be a particular series of words, a recognizable pattern of sound, or some combination of the two. For example, the application can be programmed to recognize a particular tone of a chime. In another example, the application can be programmed to recognize a trigger word. The voice-activated device can utilize this trigger to inform the application of the request and need for authentication.

At stage 220, the application can contact the application server to request authentication for the voice-activated device. This stage can be initiated by a user interacting with the application. For example, if at stage 215 the voice-activated device verbally responds to the user by informing the user that authentication is required, the user can then navigate to an appropriate page of the application on his or her user device. The application can include a page or section dedicated to connectivity to third-party devices, for example. In some examples, the user can identify the voice-activated device by using a camera of the user device to capture an image of the voice-activated device, such as by capturing a QR code on the voice-activated device. In another example, the application can provide the user with an option for selecting a graphical element on the display of the user device that corresponds to the voice-activated device. Selecting that option can cause the application to send the request at stage 220.

In some examples, stage 220 is performed automatically by the application without manual input from the user. For example, as explained with respect to step 215, the response from the voice-activated device can be a voice command, sound, or series of sounds directed to the application on the user device. In response to the application detecting the response from the voice-activated device, the application can send a request to the application server at stage 220.

At stage 225, the application server can return a first temporary key and a session ID. As explained with respect to stage 120 of FIG. 1, the key can be temporary in the sense that it is only valid for a predetermined amount of time. This time period can range from a few seconds to minutes, hours, or days, depending on the example and on settings established by an administrator. The key can take any form, such as a password, token, or certificate. As part of stage 225, the application server can also generate a session ID for the authentication session. The session ID can be an identification, such as a string of characters, that can be stored as an entry in a table. The table entry can include both the first temporary key and the session ID, associating the two with one another. The table entry can be stored in a database at the application server, or located remotely from, but accessible to, the application server. In some examples, the application can generate the session ID and include it with the request to the application server at stage 220.

At stage 230, the application can provide the first temporary key to the voice-activated device. For example, the application can display an alert that the key has been received and ask the user for confirmation that it should be transmitted to the voice-activated device. The user can provide the confirmation by selecting a "yes" button or by selecting a graphical element associated with the voice-activated device. In some examples, the applicant can automatically transmit the key to the voice-activated device. This can be useful in situations where the voice-activated device has been previously connected to the application.

The first key can be transmitted in various alternative manners, depicted by stage 235. In one example, the voice-activated device can listen for an auditory communication from the user or the user device. The user device can display the key for the user to read aloud, and the user can read the individual characters of the key to the voice-activated device. In another example, the same effect can be accomplished by the user device itself reading the characters aloud. In yet another example, the user device can produce other sounds corresponding to the key, such as by using different tone, pitch, or length of sounds to represent different characters. In some examples, the user device emits the sound in a particular frequency that is expected by the voice-activated device. For example, the user device can emit sounds in an ultrasonic frequency corresponding to the first temporary key. In an example where the voice-activated device includes a camera, stage 235 can be accomplished by the user holding the user device in a location that allows the camera of the voice-activated device to view the display of the user device. The display, in turn, can provide a visual indication of the first temporary key.

The key can also be communicated between devices using any wireless electronic communication form. For example, the devices can use NFC, BLUETOOTH, WIFI, or any other wireless protocol for communicating the key. Regardless of the transmission method, the key can be sent in an encrypted form and decrypted by the receiving device. This step can be performed automatically by the application, without requiring user interaction.

At stage 240, the voice-activated device can send the first temporary key, received from the user device, to the application server. For example, the voice-activated device can make an application programming interface ("API") call to a web location associated with the application server. The API call can include the characters of the first temporary key and an identifier signaling the location of the key. The communication can also take any other known communication form. In some examples, as part of the communication, the voice-activated device can also transmit a device ID that corresponds to the voice-activated device. The device ID need not be known by the application server in advance.

At stage 245, the application server can provide a second temporary key to the voice-activated device. For example, the application server can generate the second temporary key based on receiving the first temporary key from the voice-activated device. The second temporary key can have a similar format to the first temporary key, but in some examples can have a different format. It can be temporary based on a time limit after which the key is no longer valid. This time limit can be the same or different from the time limit applicable to the first temporary key. As part of stage 245, the application server can associate the second temporary key with the device ID of the voice-activated device. For example, the application server can store a new entry in the table, such as by saving the second temporary key and the device ID in two cells of the same row in the table.

At stages 250 and 255, the voice-activated device can provide the second temporary key to the application on the user device. These steps can be carried out using any of the methods described above with respect to stages 230 and 235. For example, the application can listen while the voice-activated device speaks the characters of the key aloud or plays sounds representing those characters. Similarly, the voice-activated device can transmit the sound in a different frequency, such as ultrasonic, so that the user does not hear the sound. Alternatively, the voice-activated device can display the key on a display, and the user can either type the key into the user device or use the camera of the user device to capture the key (such as in the example of a QC code or similar type of visual code). In another example, the key can be sent using a wireless communication protocol. Regardless of the transmission method, the key can be sent in an encrypted form and decrypted by the receiving device. This step can be performed automatically by the application, without requiring user interaction.

At stage 260, the user device can provide the second temporary key and the session ID to the application server. The session ID provided by the user device at this stage can be the same session ID provided to the user device at stage 225 of the method. This stage can also include associating the session ID with the second temporary key, such as by saving the session ID in a third field of the row of the table that includes the second temporary key. At this point in the example method, the application server has access to at least two rows of a table that include association information between the user device, voice-activated device, first temporary key, and second temporary key.

At stage 265, the application server can determine that the first and second temporary keys are each valid and associated with the same session ID and device ID. The application server can determine the validity of the keys by, for example, confirming that neither of the keys have expired based on the temporary time period assigned to each. The application server can also compare the stored entries, such as the two example rows shown above, to confirm that the session IDs and device IDs match. This can confirm that both the user device and the voice-activated device are requesting access for the same session.

Based on the determination at stage 265, the application server can authenticate the voice-activated device at stage 270. Authentication can include, for example, providing the voice-activated device with an authentication token or certificate that can be used to access enterprise data. In some examples, the authentication can be specific to the type of enterprise data requested by the user. As an example, if the method initiates based on a user asking for information about his or her enterprise email account, the authentication at stage 270 can be specific to that enterprise email account. In other examples, the authentication can broadly apply to all enterprise data. An administrator can configure the scope of the authentication provided at this stage. Additionally, the authentication can be temporary, such that the voice-activated device is only authorized to access the relevant enterprise data for a predetermined period of time. Stage 270 can also include delivering the enterprise content to the user device by the application server, either directly or by instructing another server to deliver the content on behalf of the application server.

Figure 3:
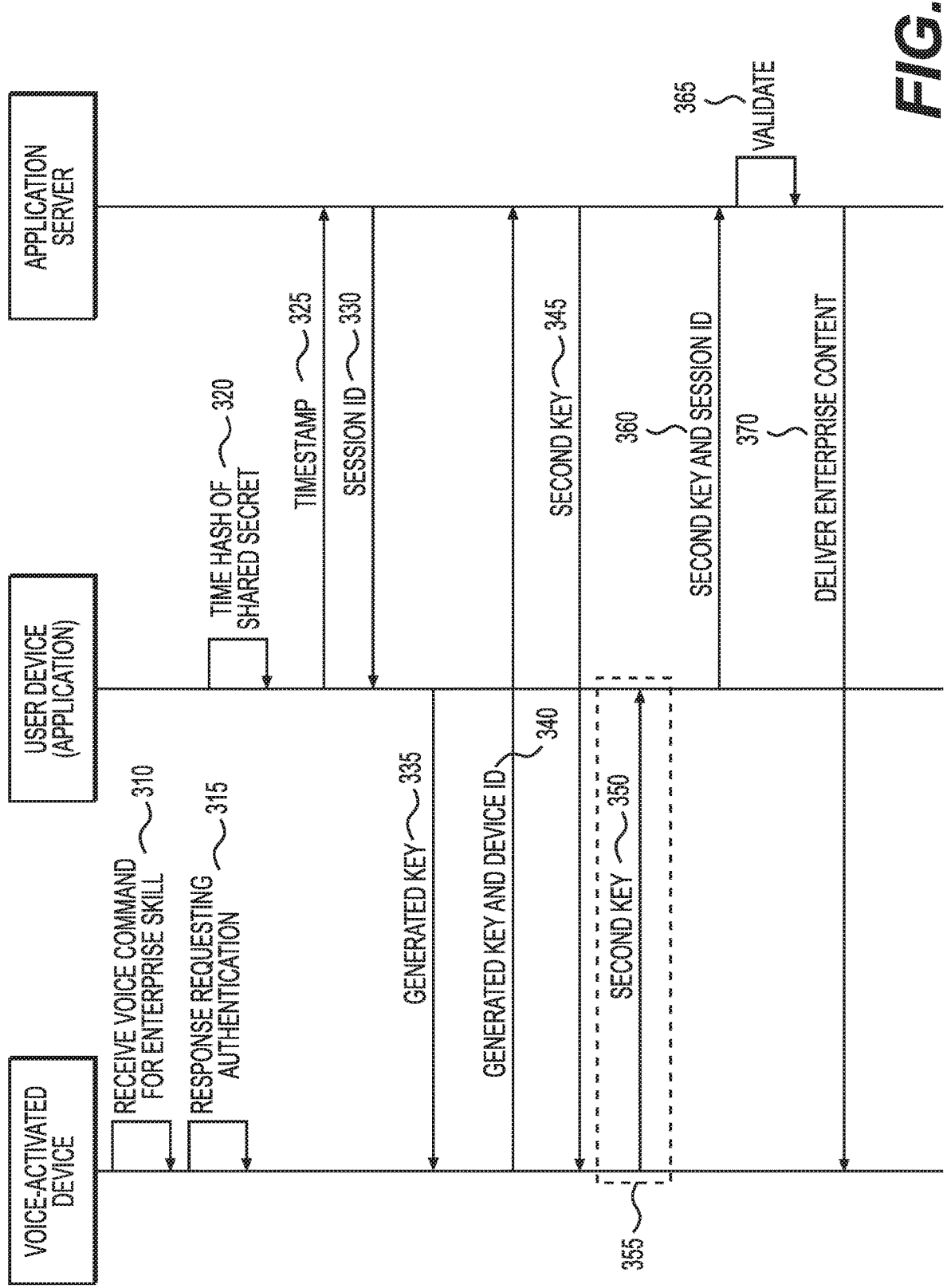
FIG. 3 is a sequence diagram of another example method for authenticating a voice-activated device.

FIG. 3 provides a sequence diagram of an example method for authentication of a voice-activated device. In the example of FIG. 3, the user device utilizes a pre-shared key to assist in the authentication process. Some of the stages of the sequence diagram of FIG. 3 are similar to the stages of the sequence diagram of FIG. 2. For example, at stage 310, the voice-activated device can receive a voice command from a user for an enterprise skill, as discussed with respect to stage 210 of FIG. 2. At stage 315, the voice-activated device can respond to the user, as discussed with respect to stage 215 of FIG. 2.

At stage 320, the application can generate a key (referred to as the "generated key"). The generated key can be generated by utilizing another key that has been "pre-shared" between the application server and the user device. The pre-shared key can also be referred to as a shared secret. In some examples, the voice-activated device never receives the pre-shared key. Stage 320 can include hashing the pre-shared key to obtain the generated key. In some examples, the hashing can be based on a hash function corresponding to the time at which the hashing occurs. For example, a timestamp can be generated or captured and used as the hash function for creating the generated key.

That timestamp can be provided to the application server at stage 325. Because the application server also has access to the pre-shared key, it can recreate the generated key by applying the timestamp as a hash function to the pre-shared key. The application server can recreate the generated key at stage 325 and store it in a row of a table. The application server can also assign a session ID at stage 330 and provide it to the application. As part of stage 330, the application server can associate the session ID with the generated key by storing both in the same row of a table, for example.

The application can provide the generated key to the voice-activated device at stage 335. This stage can be performed in various ways. In one example, the application can display an alert that the generated key is ready and ask the user for confirmation that it should be transmitted to the voice-activated device. The user can provide the confirmation, for example, by selecting a "yes" button, issuing a voice command, or by selecting a graphical element associated with the voice-activated device. In some examples, the applicant can automatically transmit the generated key to the voice-activated device. This can be useful in situations where the voice-activated device has been previously connected to the application.

The generated key can be transmitted in various alternative manners. In one example, the voice-activated device can listen for an auditory communication from the user or the user device. The user device can display the generated key for the user to read aloud, and the user can read the individual characters of the generated key to the voice-activated device. In another example, the same effect can be accomplished by the user device itself reading the characters aloud. In yet another example, the user device can produce other sounds corresponding to the generated key, such as by using different tone, pitch, or length of sounds to represent different characters. In some examples, the user device emits the sound in a particular frequency that is expected by the voice-activated device. For example, the user device can emit sounds in an ultrasonic frequency corresponding to the generated key. In an example where the voice-activated device includes a camera, stage 335 can be accomplished by the user holding the user device in a location that allows the camera of the voice-activated device to view the display of the user device. The display, in turn, can provide a visual indication of the generated key.

The key can also be communicated between devices using any wireless electronic communication form. For example, the devices can use NFC, BLUETOOTH, WIFI, or any other wireless protocol for communicating the key. Regardless of the transmission method, the key can be sent in an encrypted form and decrypted by the receiving device. This step can be performed automatically by the application, without requiring user interaction.

At stage 340, the voice-activated device can provide the generated key to the application server, such as by making an API call as described with respect to stage 240 of FIG. 2. In some examples, as part of the communication, the voice-activated device can also transmit a device ID that corresponds to the voice-activated device. The device ID need not be known by the application server in advance.

The remaining stages are similar to those described at stages 245-270 of FIG. 2. At stage 345, the application server can provide a second temporary key to the voice-activated device. For example, the application server can generate the second temporary key based on receiving the generated key from the voice-activated device. The second temporary key can be temporary based on a time limit after which the key is no longer valid. This time limit can be the same or different from a time limit applicable to the generated key. As part of stage 345, the application server can associate the second temporary key with the device ID of the voice-activated device. For example, the application server can store a new entry in the table, such as by saving the second temporary key and the device ID in two cells of the same row in the table.

At stages 350 and 355, the voice-activated device can provide the second temporary key to the application on the user device. These steps can be carried out using any of the methods described above with respect to stages 230 and 235 of FIG. 2 and stages 335 of FIG. 3. For example, the application can listen while the voice-activated device speaks the characters of the key aloud or plays sounds representing those characters. Similarly, the voice-activated device can transmit the sound in a different frequency, such as ultrasonic, so that the user does not hear the sound. Alternatively, the voice-activated device can display the key on a display, and the user can either type the key into the user device or use the camera of the user device to capture the key (such as in the example of a QR code or similar type of visual code). In another example, the key can be sent using a wireless communication protocol. Regardless of the transmission method, the key can be sent in an encrypted form and decrypted by the receiving device. This step can be performed automatically by the application, without requiring user interaction.

At stage 360, the user device can provide the second temporary key and the session ID to the application server. The session ID provided by the user device at this stage can be the same session ID provided to the user device at stage 330 of the method. This stage can also include associating the session ID with the second temporary key, such as by saving the session ID in a third cell of the row of the table that includes the second temporary key. At this point in the example method, the application server has access to association information between the user device, voice-activated device, generated key, and second temporary key.

At stage 365, the application server can determine that the generated key and second temporary key are each valid and associated with the same session ID and device ID in the stored table. The application server can determine the validity of the keys by, for example, confirming that neither of the keys have expired based on the temporary time period assigned to each. The application server can also compare the stored entries, such as the two example rows shown above with respect to FIG. 1, to confirm that the session IDs and device IDs match. This can confirm that both the user device and the voice-activated device are requesting access for the same session.

Based on the determination at stage 365, the application server can authenticate the voice-activated device at stage 370. Authentication can include, for example, providing the voice-activated device with an authentication token or certificate that can be used to access enterprise data. In some examples, the authentication can be specific to the type of enterprise data requested by the user. As an example, if the method initiates based on a user asking for information about his or her enterprise email account, the authentication at stage 370 can be specific to that enterprise email account. In other examples, the authentication can broadly apply to all enterprise data. An administrator can configure the scope of the authentication provided at this stage. Additionally, the authentication can be temporary, such that the voice-activated device is only authorized to access the relevant enterprise data for a predetermined period of time. Stage 370 can also include delivering the enterprise content to the user device by the application server, either directly or by instructing another server to deliver the content on behalf of the application server.

In some examples, procedures can be used to protect enterprise information in situations where more than one user device, or more than one voice-activated device, are located in proximity to each other as the temporary keys are transmitted. When the keys are transmitted out loud, any listening device can receive them. This can result in multiple user devices attempting to report a key to the application server, or alternatively, multiple voice-activated devices to report a key to the application server. In some examples, both of these events should be blocked to avoid sharing enterprise data with an unauthorized user device or voice-activated device. The application server can block either of these example situations by, for example, invalidating the session associated with the session ID in response to receiving the same key from multiple user devices or from multiple voice-activated devices.

Figure 4:
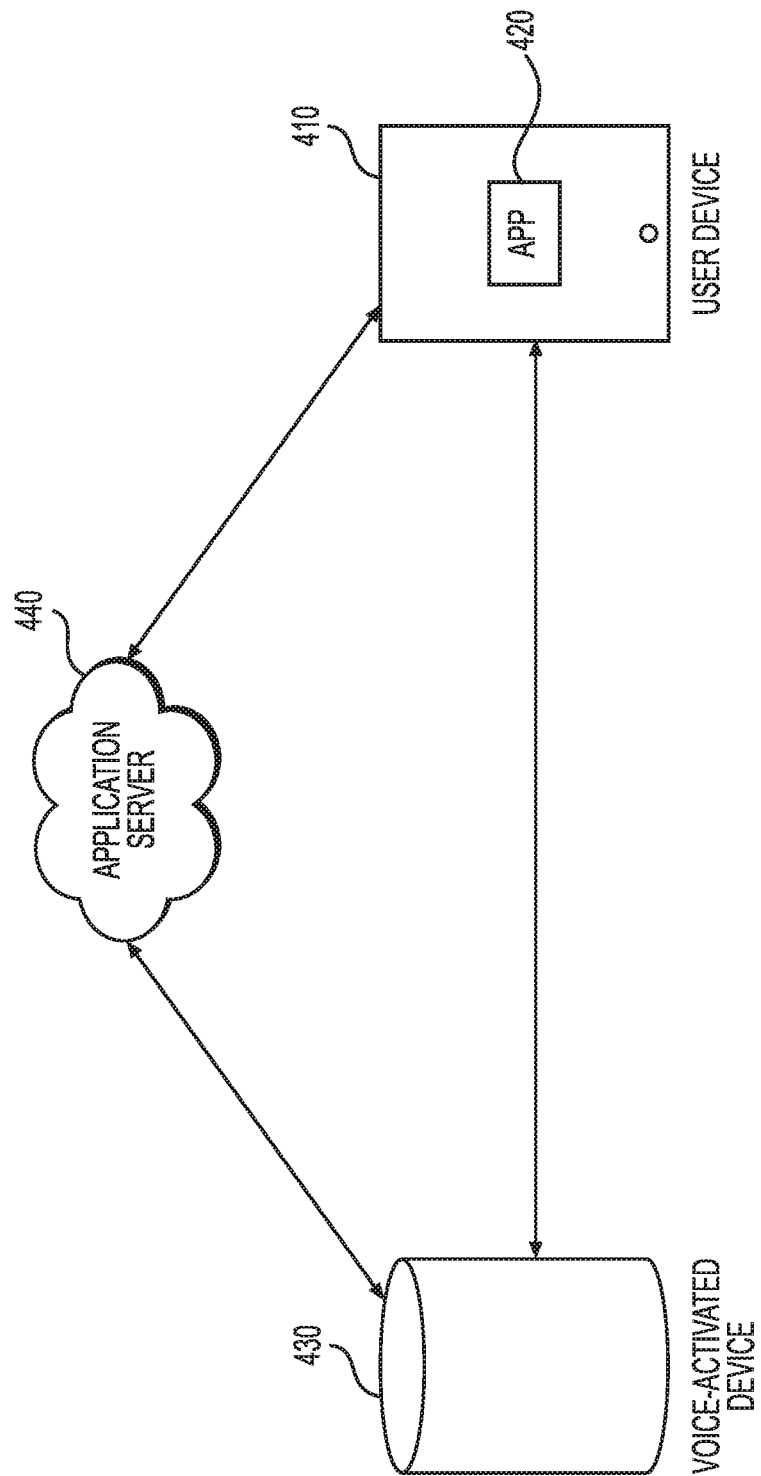
FIG. 4 is an illustration of a system for authenticating a voice-activated device.

FIG. 4 provides an illustration of a system diagram for carrying out the example methods described herein. The illustration shows a user device 410, a voice-activated device 430, and an application server 440. The user device 410 can be any type of computing device with a hardware-based processor and a memory storage, such as a phone, tablet, laptop computer, or desktop computer. The user device 410 can also include a display for displaying information and receiving input from a user.

The user device 410 can execute an application 420. The application 420 can be a "managed" application that is managed by the application server 440 or by a separate server. The application 420 can be managed in the sense that a separate server controls at least some functionality of the application 420, such as whether the application 420 is authenticated to retrieve enterprise content from an enterprise repository. Regardless of which server controls authentication, that server can provide the user device 410 with an authentication credential that can be used by the application 420 when communicating with an enterprise server or repository.

In some examples, the application 420 can enforce compliance rules on behalf of the managing server. For example, a management server or the application server 440 can provide a profile that includes compliance rules associated with the user device 410. The application 420 can retrieve information about the user device 410, compare that information to the requirements in the profile, and implement remedial actions as prescribed by the profile. In some examples, the application 420 can send a "heartbeat" communication to the management server or application server 440, providing current status information of the user device 410 such that the relevant server can determine whether applicable compliance rules are satisfied.

In one example, the application 420 is a portal application that provides access to a variety of other applications and services. The portal application can display icons for the available applications and can leverage SSO techniques to authenticate the user across multiple applications without requiring manual logins at each application. The portal application can therefore provide convenient access to various applications, including native applications, web-based applications, managed applications, and unmanaged applications. It can also connect to a voice-activated device 430 and include functionality for communicating with that device 430 in the manner described previously.

The voice-activated device 430 can be any type of computing device having a hardware-based processor. It can also include a microphone and a speaker. It can be configured to receive voice commands from a user through the microphone and to communicate with the user through the speaker. For example, the voice-activated device 430 may have a "virtual assistant" functionality that allows the device to recognize words spoken by a user, parse those words for a relevant voice command, and take some action in response to the command. For example, a user can ask the voice-activated device 430 to play a song, open an application, read a message, or check the weather. The voice-activated device 430 can recognize the request based on the words spoken by the user, identify the correct location of the requested information, retrieve that information, and communicate it to a user. The voice-activated device 430 can also include a display for displaying information to the user.

The system of FIG. 4 can also include an application server 440. The application server 440 can be a single server or a network of servers. As used herein, the term "server" is intended to capture virtual servers, such as a virtual instance of a server running on a virtual machine that overlays computing hardware. The application server 440 can including computing, storage, and networking capabilities. The application server 440 can provide the application 420 with privileged access, such as by issuing an authentication credential to the application 420 that can be renewed or revoked as needed.

In some examples, the application server 440 can enforce policies at the user device 410 through the application 420 executing on the user device. For example, the application server 440 can send a profile to the user device 410 and the application 420 can implement procedures dictated by the profile. Although not shown, the system can also include a management server that provides these enforcement policies at the user device.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for authenticating a voice-activated device using an application server that supports an application on a user device, comprising:

receiving, at the application server, a request from the user device to authenticate the voice-activated device, wherein the voice-activated device is not authenticated at the time of the request;

in response to the request from the user device, providing a first temporary key and a session ID from the application server to the user device without communication via the voice-activated device and causing the user device to provide the first temporary key to the voice-activated device, wherein providing the first temporary key to the user device comprises providing a pre-shared key to the user device, the user device generating the first temporary key by hashing the pre-shared key with a hash function based on a timestamp;

receiving, at the application server from the voice-activated device, the first temporary key that has been provided from the application server to the user device, and then from the user device to the voice-activated device;

in response to receiving, at the application server from the voice-activated device, the first temporary key provided to the user device, providing a second temporary key from the application server to the voice-activated device without communication via the user device and causing the voice-activated device to provide the second temporary key to the user device;

receiving, at the application server from the user device, the second temporary key that has been provided from application server to the voice-activated device, and then from the voice-activated device to the user device and the session ID; and at the application server, determining that the first and second temporary keys are each valid and that the session ID that the application server provided with the first temporary key to the user device is the same session ID that the application server received with the second temporary key from the user device, and in response to said determining, authenticating the voice-activated device.

2. The method of claim 1, wherein the voice-activated device receives the first temporary key based on listening to noise emitted from the user device.

3. The method of claim 1, wherein the voice-activated device and the user device communicate the first and second temporary keys between one another using ultrasound communication.

4. The method of claim 1, wherein a verbal request for enterprise content, spoken to the voice-activated device, causes the voice-activated device to listen for the first temporary key.

5. The method of claim 1, wherein at least one of the first and second temporary keys is communicated between the voice-activated device and the user device in an encrypted form using a wireless communication protocol.

6. A non-transitory, computer-readable medium containing instructions that, when executed by a hardware-based processor, performs stages for authenticating a voice-activated device using an application server that supports an application on a user device, the stages comprising:

receiving, at the application server, a request from the user device to authenticate the voice-activated device, wherein the voice-activated device is not authenticated at the time of the request;

in response to the request from the user device, providing a first temporary key and a session ID from the application server to the user device without communication via the voice-activated device and causing the user device to provide the first temporary key to the voice-activated device, wherein providing the first temporary key to the user device comprises providing a pre-shared key to the user device, the user device generating the first temporary key by hashing the pre-shared key with a hash function based on a timestamp;

receiving, at the application server from the voice-activated device, the first temporary key that has been provided from the application server to the user device, and then from the user device to the voice-activated device;

in response to receiving the first temporary key provided to the user device, providing a second temporary key from the application server to the voice-activated device without communication via the user device and causing the voice-activated device to provide the second temporary key to the user device;

receiving, at the application server from the user device, the second temporary key that has been provided from application server to the voice-activated device, and then from the voice-activated device to the user device and the session ID; and at the application server, determining that the first and second temporary keys are each valid and that the session ID that the application server provided with the first temporary key to the user device is the same session ID that the application server received with the second temporary key from the user device, and in response to said determining, authenticating the voice-activated device.

7. The non-transitory, computer-readable medium of claim 6, wherein the voice-activated device receives the first temporary key based on listening to noise emitted from the user device.

8. The non-transitory, computer-readable medium of claim 6, wherein the voice-activated device and the user device communicate the first and second temporary keys between one another using ultrasound communication.

9. The non-transitory, computer-readable medium of claim 6, wherein a verbal request for enterprise content, spoken to the voice-activated device, causes the voice-activated device to listen for the first temporary key.

10. The non-transitory, computer-readable medium of claim 6, wherein the voice-activated device displays the second temporary key on a display and the user device receives the second temporary key by using a camera functionality.

11. A system for authenticating a voice-activated device using an application server that supports an application on a user device, comprising:

a memory storage including a non-transitory, computer-readable medium comprising instructions; and a computing device including a hardware-based processor that executes the instructions to carry out stages comprising:

receiving, at the application server, a request from the user device to authenticate the voice-activated device, wherein the voice-activated device is not authenticated at the time of the request;

in response to the request from the user device, providing a first temporary key and a session ID from the application server to the user device without communication via the voice-activated device and causing the user device to provide the first temporary key to the voice-activated device, wherein providing the first temporary key to the user device comprises providing a pre-shared key to the user device, the user device generating the first temporary key by hashing the pre-shared key with a hash function based on a timestamp;

receiving, at the application server from the voice-activated device, the first temporary key that has been provided from the application server to the user device, and then from the user device to the voice-activated device;

in response to receiving the first temporary key at the application server from the voice-activated device, providing a second temporary key from the application server to the voice-activated device without communication via the user device and causing the voice-activated device to provide the second temporary key to the user device;

receiving, at the application server from the user device, the second temporary key that has been provided from application server to the voice-activated device, and then from the voice-activated device to the user device and the session ID; and at the application server, determining that the first and second temporary keys are each valid and that the session ID that the application server provided with the first temporary key to the user device is the same session ID that the application server received with the second temporary key from the user device, and in response to said determining, authenticating the voice-activated device.

12. The system of claim 11, wherein the voice-activated device receives the first temporary key based on listening to noise emitted from the user device.

13. The system of claim 11, wherein a verbal request for enterprise content, spoken the voice-activated device, causes the voice-activated device to listen for the first temporary key.

14. The system of claim 11, wherein the voice-activated device and the user device communicate the first and second temporary keys between one another using ultrasound communication.

15. The method of claim 1, wherein the request is issued by the user device in response to the application on the user device recognizing a sound indicating need of authentication of the voice-activated device, the sound being emitted from the voice-activated device.

16. The non-transitory, computer-readable medium of claim 6, wherein the request is issued by the user device in response to the application on the user device recognizing a sound indicating need of authentication of the voice-activated device, the sound being emitted by the voice-activated device.

17. The system of claim 11, wherein the request is issued by the user device in response to the application on the user device recognizing a sound indicating need of authentication of the voice-activated device, the sound being emitted by the voice-activated device.

* * * * *